Oct. 31, 1944. L. E. MAUPIN 2,361,862
AIRCRAFT POSITION INDICATOR
Filed Feb. 5, 1943
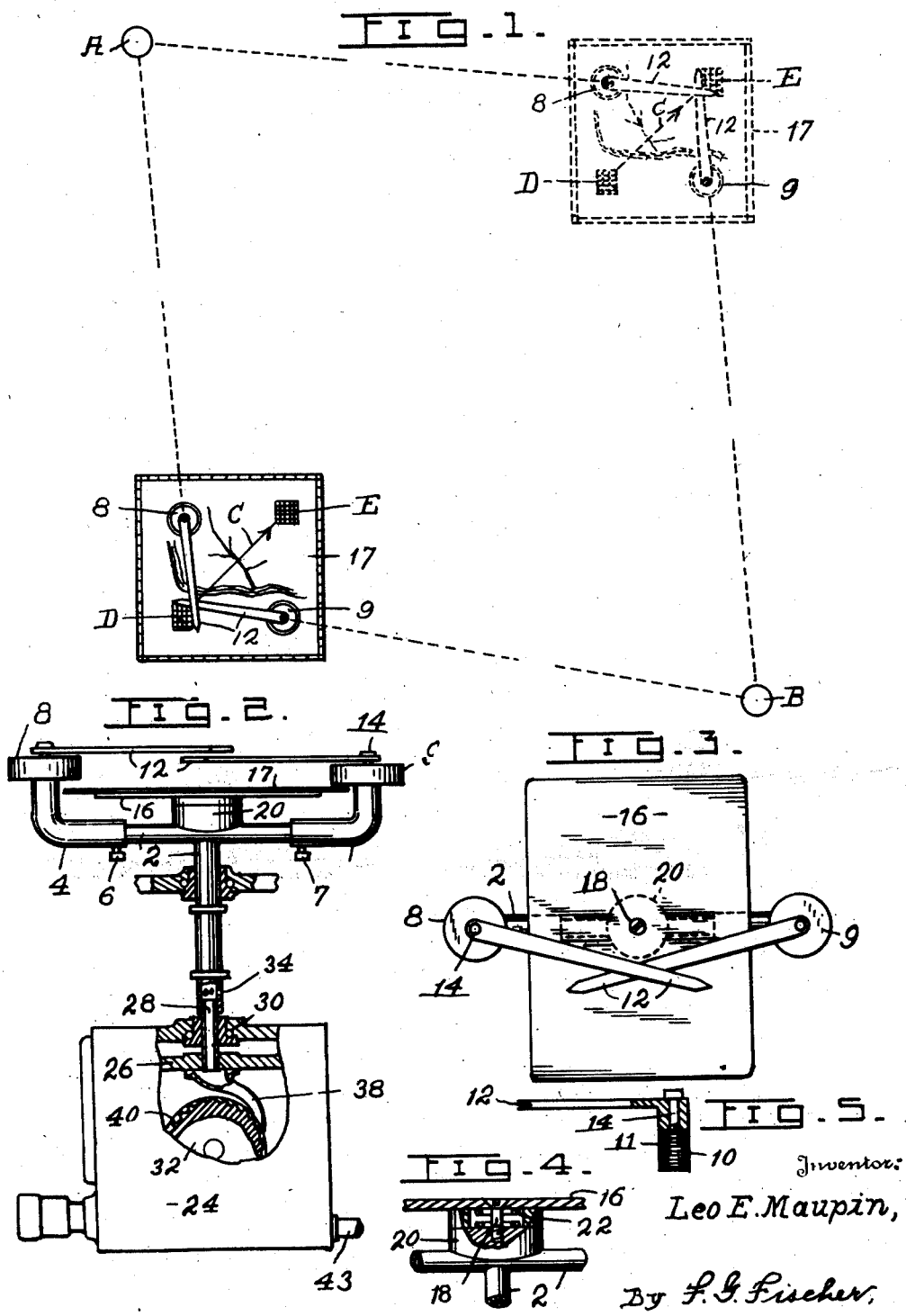
Inventor:
Leo E. Maupin,
By F. G. Fischer,
Attorney.

Patented Oct. 31, 1944

2,361,862

UNITED STATES PATENT OFFICE 2,361,862

AIRCRAFT POSITION INDICATOR

Leo E. Maupin, North Kansas City, Mo.

Application February 5, 1943, Serial No. 474,839

2 Claims. (Cl. 33—98)

My invention relates to a navigational instrument in the form of an automatic indicator for use on different kinds of craft, but more particularly on aircraft, to afford the pilot a constant reference of his heading and position with respect to a line of flight, without the necessity of resorting to references outside of the aircraft, or plotting on a map.

An object of my invention is to provide an indicator having two pointers for constantly indicating on an associated map the position of the aircraft while in flight.

A further object is to provide a simple and efficient navigational instrument which can be controlled by conventional instruments now in general use on aircraft for directional guidance of the pilot.

In order that the invention may be fully understood reference will now be had to the accompanying drawing, in which:

Fig. 1 is a diagrammatic view of the navigational instrument, associated with a flight map and two broadcasting stations.

Fig. 2 is a side elevation, partly in section, of the instrument.

Fig. 3 is a plan view of the instrument.

Fig. 4 is a fragmentary sectional view.

Fig. 5 is a fragmentary sectional view showing a pointer of my instrument connected to the rotor of a radio receiver, such, for instance, as an "Autosyn" receiver.

Referring in detail to the different parts of the instrument, 2 designates a tubular support, preferably of T-form, provided with two oppositely disposed elbows 4 and 5 telescopically mounted upon the transverse upper portion of the support so that they may be adjusted in opposite directions to provide space for various sizes of maps used in connection with my instrument. The elbows 4 and 5 are secured after adjustment by appropriate means such, for example, as set screws 6 and 7, threaded in the respective elbows and adapted to frictionally engage the transverse upper portion of the tubular support 2.

The upturned outer ends of the elbows 4 and 5 are equipped with suitable radio receivers 8 and 9, each of which has a rotor 10 with a coil 11 and provided at its upper end with a pointer 12. The pointers 12 are adjustably mounted upon the upper ends of the respective rotors 10, so that the pilot, preparatory to starting on a flight, may adjust the pointers to indicate the position of the aircraft with respect to two broadcasting stations A and B, respectively, tuned to transmit signals for guidance of the pilot while in flight. Adjustable mounting of each pointer 12 can be effected in any suitable manner, such, for example, as a screw 14 threaded in the associated rotor and extending freely through the rear portion of the pointer to constitute an axis upon which the pointer may be freely rotated. After proper adjustment of the pointer it is firmly clamped between the enlarged head of the screw 14 and the upper end of the respective rotor, so that the latter, when electrically energized, will automatically control the pointer.

The tubular support 2 is provided at its upper portion with a map holder 16, mounted in an appropirate manner so that it may be manually rotated independently of the tubular support to position a flight map 17 thereon in proper respect to the north geographic pole. In the present instance I have shown the map holder mounted upon a central pivot 18 threaded in a block 20 fixed to the transverse upper part of the tubular support. An expansible spring 22 surrounding the pivot 18 frictionally engages the underside of the map holder to prevent accidental turning thereof upon the pivot. Any suitable means (not shown) may be employed for securing the map from accidental shifting upon the holder 16. The map 17, in addition to depicting other data that may be useful to the pilot, illustrates a line of flight C extending from a starting point D to a selected location E, the distance of which latter from the former is known to the pilot and if desired may be indicated on the map.

The tubular support 2 and the map holder 16 are held in their manually set positions by means of a gyroscopic compass 24, which performs its usual function of establishing a fixed reference for maintaining flight direction. The gyroscopic compass 24 is preferably of conventional form, excepting that the upper pivot of the gimbal ring 26 is replaced with a nipple 28 extending through a ball bearing 30 and fixed at its upper and lower ends in the lower part of the tubular support 2 and the gimbal ring 26, respectively. The air stream which spins the gyro rotor 32 enters through perforations 34 in the lower portion of the tubular support 2, passes through the nipple 28 and is discharged from a nozzle 38, fixed to the gimbal ring 26, against the blades 40 of the rotor 32 and is then drawn outward through the line 43 by a vacuum pump, not shown.

Instead of employing the customary single set of instruments for receiving signals from a single broadcasting station, I provide the aircraft with conventional duplicate sets which are tuned to the frequencies of two respective broadcasting stations A and B located along the line of flight.

Preparatory to starting on a flight such, for instance, as that indicated on the map 17 by the reference character C the map 17, which is drawn to a predetermined scale, is secured upon the holder 16 and then orientated with respect to the north geographic pole. The receivers 8 and 9 are then brought into position with the respective broadcasting stations A and B by proper adjustment of the support 2. The pointers 12 are turned to point from the respective broadcasting stations to the starting point D and the gyroscopic compass 24 is set to the magnetic compass, not shown. During the actual flight the receivers 8 and 9 are energized and gradually move the intersecting pointers 12 from the starting point D towards the selected location E which is reached by the intersecting portions of the pointers at the same time that the aircraft completes its flight. During the movement of the pointers 12 their intersecting portions cooperate with the depicted line of flight C in indicating the position of the aircraft throughout the flight and any deviation of the aircraft to the right or left will be instantly indicated by the instrument.

From the foregoing it will be understood that by employing two pointers 12, controlled as stated, and having their intersecting portions co-operate with a depicted line of flight on an associated map, the pilot will be constantly advised of the position of the aircraft throughout the flight without the necessity of making periodical computations during the flight.

While I have shown a preferred form of my invention, I reserve all rights to such modifications as properly fall within the scope of the invention as claimed.

Having thus described my invention, what I claim and desire to secure by Letters Patent, is:

1. In combination, a position indicator comprising supporting means, a gyro compass having a gimbal ring rotatable about a normally vertical axis and upon which said supporting means is fixed, two electrically controlled means spaced apart upon said supporting means each having a rotor, and a pair of intersecting pointers mounted upon said rotors, respectively, to rotate therewith.

2. In combination, a position indicator comprising supporting means having a normally vertical axis, a gyro compass having a gimbal ring rotatable about said axis and upon which the supporting means is fixed, a map holder mounted upon the supporting means, a pair of intersecting elements movable over the map holder, and electrically controlled rotors mounted in the supporting means and upon which said intersecting means are respectively mounted.

LEO E. MAUPIN.